United States Patent [19]

Deitz et al.

[11] Patent Number: 4,614,818
[45] Date of Patent: Sep. 30, 1986

[54] PROCESS FOR THE PREPARATION OF AMINO-FLUORO-S-TRIAZINE DYES BY REACTION OF CYANURIC FLUORIDE WITH AN AMINO DYE AND AN AMIDE IN ONE OPERATION

[75] Inventors: Rolf Deitz, Basel; Herbert Seiler, Riehen, both of Switzerland

[73] Assignee: Ciba Geigy Corporation, Ardsley, N.Y.

[21] Appl. No.: 458,800

[22] Filed: Jan. 18, 1983

Related U.S. Application Data

[63] Continuation of Ser. No. 268,306, May 29, 1981.

[30] Foreign Application Priority Data

May 30, 1980 [CH] Switzerland ............ 4229/80

[51] Int. Cl.[4] .................. C09B 62/06; C09B 62/085; C09B 62/095; C09B 62/10
[52] U.S. Cl. .................................. 534/598; 534/618; 534/622; 534/627; 534/632; 534/635; 534/636; 534/637; 534/638; 544/181; 544/187; 544/194; 544/204
[58] Field of Search .................. 260/146 T, 147, 153; 534/598, 618, 622, 627, 632, 635, 636, 637, 638; 544/181, 187, 194, 204

[56] References Cited

U.S. PATENT DOCUMENTS 4,066,389 1/1978 Riat et al. .................. 260/153

FOREIGN PATENT DOCUMENTS 1188606 4/1970 United Kingdom ............ 260/153

OTHER PUBLICATIONS

Beech, "Fibre-Reactive Dyes", Logos Press Limited, London, pp. 84 to 86, 91, and 148 to 153 (1970).

Primary Examiner—Floyd D. Higel

Attorney, Agent, or Firm—Joseph G. Kolodny

[57] ABSTRACT

A process for the preparation of dyes of the formula

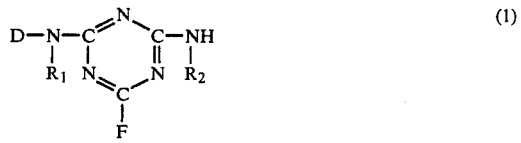

in which D is a dye radical and $R_1$ and $R_2$ independently of one another is hydrogen or $C_{1-4}$-alkyl, which comprises reacting cyanuric fluoride of the formula

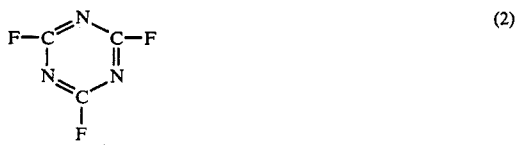

simultaneously with a dye of the formula

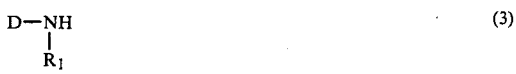

and with an ammonium salt of an amine of the formula $$H_2N-R_2 \quad (4)$$

in a neutral to alkaline medium, to give dyes of the formula (1) as single compounds in good yields in one operation. The novel process has the advantage of being able to be carried out as a "one-pot process" in a closed reaction vessel so that the apparatus is simple and immission by cyanuric fluoride is excluded.

8 Claims, No Drawings

PROCESS FOR THE PREPARATION OF AMINO-FLUORO-S-TRIAZINE DYES BY REACTION OF CYANURIC FLUORIDE WITH AN AMINO DYE AND AN AMIDE IN ONE OPERATION

This is a continuation of application Ser. No. 268,306, filed 5-29-81.

The invention relates to a process for the preparation of dyes of the formula

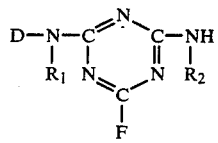  (1)

in which D is a dye radical and $R_1$ and $R_2$ independently of one another is (sic) hydrogen or $C_{1-4}$-alkyl, which comprises reacting cyanuric fluoride of the formula

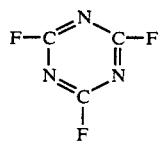  (2)

simultaneously with a dye of the formula

  (3)

and with an ammonium salt of an amine of the formula

  (4)

in a neutral to alkaline medium.

Dyes of the formula (1) are prepared by known processes (cf., for example, German Offenlegungsschrift No. 2,557,141) by subjecting cyanuric fluoride of the formula (2) to condensation with a dye of the formula (3), and subjecting the primary condensation product to monocondensation with an amine of the formula (4), or by carrying out the two condensations described in reverse sequence. The condensations are carried out in aqueous solution. Because the three fluorine atoms on the triazine ring have different reactivities, the reaction temperature chosen is 0° to 5° C. for the first condensation, and about 0° C. to room temperature, depending on the nature of the radical $R_2$, for the second condensation. The procedure in practice is initially to introduce the amino dye in aqueous solution into the reaction vessel, to add cyanuric fluoride dropwise until reaction is complete and then to add the amine for the second condensation. The reverse sequence of condensations is carried out in a corresponding manner.

The known process has a disadvantage. Since the amine is used in excess, the pH value of the reaction mixture rises sharply when the amine is added. Detachment of the fluorine atoms from the triazine ring by hydrolysis is thereby favoured, and as a result some of the difluorotriazine dye or of the cyanuric fluoride is "hydrolysed", and a reduced yield results.

We have found that the abovementioned disadvantage can be avoided by the novel process defined above.

This process is a single-stage process which is carried out by initially introducing the amino dye and the amine in solution into the reaction vessel and adding cyanuric fluoride dropwise until reaction is complete. Since two fluorine atoms of the cyanuric fluoride are simultaneously replaced, from the start the reaction is carried out between about 0° C. and room temperature.

The novel process has the advantage that it can be carried out as a "one-pot process" in a closed reaction vessel. The apparatus is therefore simple, and immission by cyanuric fluoride is excluded.

The condensation in the process takes place instantaneously and the dye of the formula (1) is formed as a single compound.

It would have been expected that, under the given conditions, the very reactive cyanuric fluoride would react immediately with any reactant, i.e. amino dye or amine, when it is added dropwise to the reaction mixture, so that a mixture of primary condensation products of the formulae

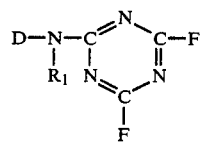  (Ia)

and

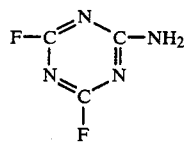  (Ib)

is formed which, because of the adverse stoichiometric proportions, further reacts only very slowly. It would furthermore have been expected that the primary condensation products of the abovementioned formulae would partly react further with the same reaction partner of the cyanuric fluoride as initially, so that undesired symmetric bicondensation products are formed. It would also have been expected that the reaction would proceed with a considerable delay, and that the yield of the desired end product of the formula (1) would be significantly lower compared with that in the conventional process.

Surprisingly, it is found that this is not the case, and that, rather, the reaction mixture reacts smoothly and rapidly and the dyestuff of the formula (1) is obtained as a single compound in good yield in one operation.

The reaction according to the invention can be carried out in organic solvents, for example diethyl ether or acetone, or in aqueous solution. Preferably, the cyanuric fluoride is introduced into an aqueous solution containing the amino dye and the ammonium salt of the amine. The amine is continuously set free from the ammonium salt by constant addition of an alkali, for example sodium hydroxide solution, during the condensation. In one embodiment, the pH value of the aqueous solution is adjusted to 7 to 10, preferably 8 to 9.

Amines of the formula (4) are: ammonia, methylamine, ethylamine, propylamine, isopropylamine, butylamine, isobutylamine, sec.-butylamine and tert.-butylamine.

Ammonium salts are the salts of inorganic acids, in particular the chlorides, sulphates, carbonates and phosphates. Examples of ammonium salts of amines which can be used according to the invention are: ammonium chloride, ammonium sulphate, ammonium carbonate, methylammonium chloride, methylammonium sulphate, ethylammonium chloride and β-hydroxyethylammonium chloride. Ammonia is preferably used as the amine of the formula (4), and is preferably employed in the form of ammonium chloride.

The dyestuffs of the formula (3) used are, in particular, those in which the radical D is the radical of a dye of the monoazo or polyazo, metal complex azo, anthraquinone, phthalocyanine, formazan, dioxazine, phenazine or stilbene series.

Dyes of the formula (3) in which the radical D contains groups which confer solubility in water are preferably used as the starting materials.

A group which confers solubility in water is, in particular, the sulphonic acid group.

The alkyl substituent $R_1$ having 1 to 4 carbon atoms in formula (1) or (3) is: methyl, ethyl, propyl, isopropyl, butyl, isobutyl, sec.-butyl or tert.-butyl.

The radical of a dye D in formula (1) or (3) can contain further substitutents, examples of which are: alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino and propionylamino, benzoylamino, halogen, such as fluorine, chlorine and bromine, nitro, cyano, trifluoromethyl, sulfamoyl, carbamoyl, ureido, amino, hydroxyl, carboxyl, sulfomethyl and sulfo. In particular, the radical D contains sulfonic acid groups as substituents.

An aminoazo dye is preferably used as the dye of the formula (3). In particular, dyes of the formula (3) in which D is the radical of a monoazo or disazo dye are used as starting materials.

Dyes of the formula (3) in which $R_1$ is hydrogen, methyl or ethyl are also preferred.

In other preferred embodiments, an aminoazo dye of the formula

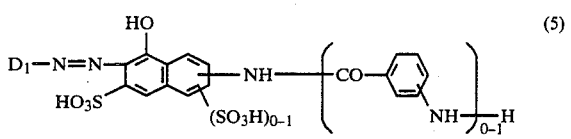

(5)

in which $D_1$ is the radical of a diazo component of the benzene or naphthalene series, is used, in particular, an aminoazo dyes of the formula

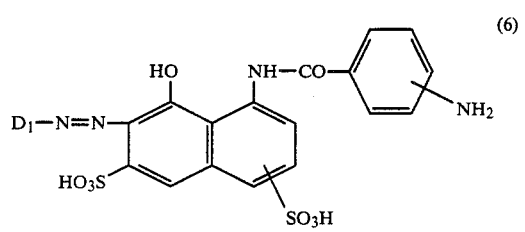

(6)

in which $D_1$ is the radical of a diazo component of the benzene or naphthalene series, is used, and, especially, the dye of the formula

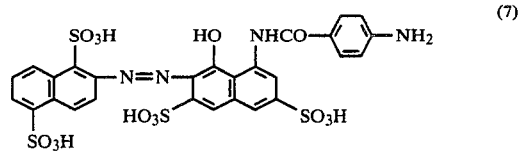

(7)

is used.

Dyes of the formula (3) are, in particular, dyes of the following structural types:

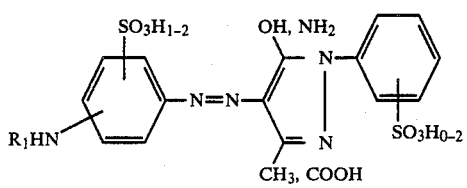

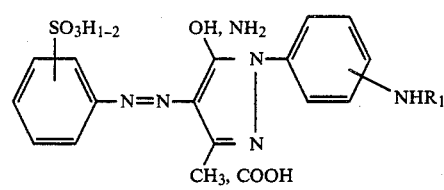

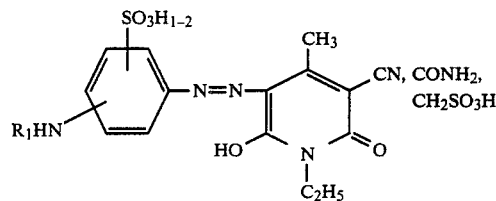

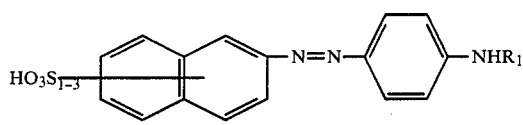

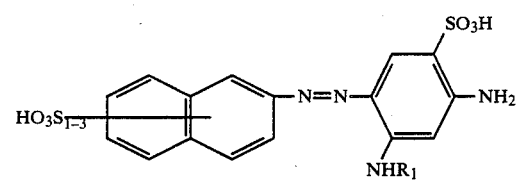

and

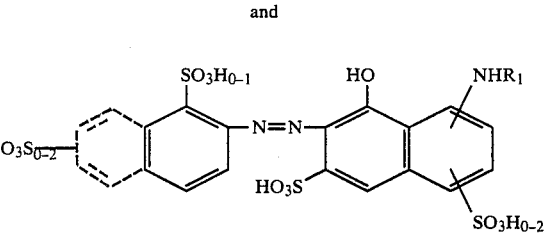

Metal complexes of dyes of the formulae

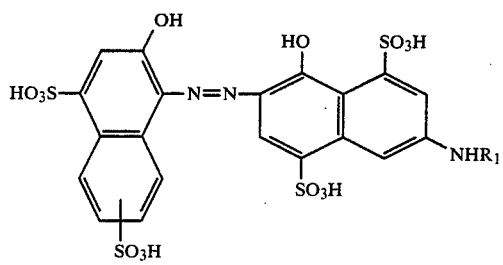

and

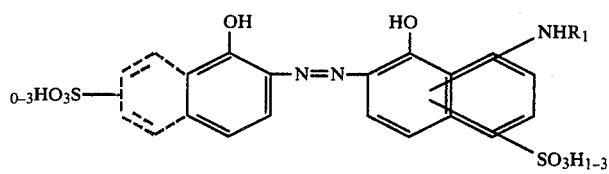

Preferred metal atoms are Cu (1:1 complex) or Cr and Co (1:2 complexes). Cr and Co complexes can contain one or two radicals of the azo compound of the above-mentioned formula, i.e. they can be built up symmetrically, or unsymmetrically with any other ligand groupings.

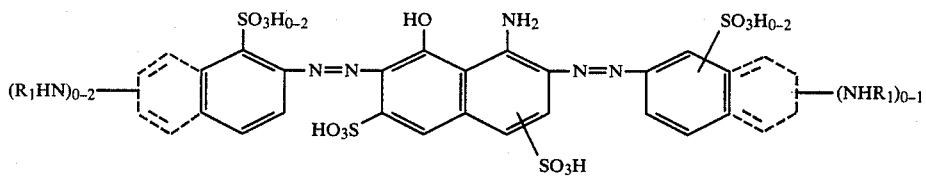

The fused-on rings indicated by broken lines are naphthalene systems which are alternatively possible.

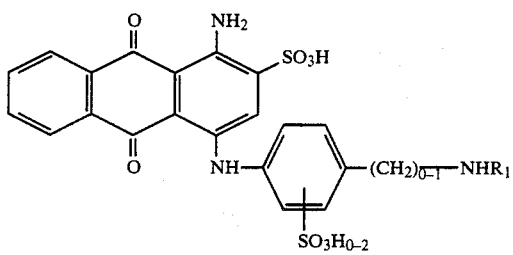

-continued

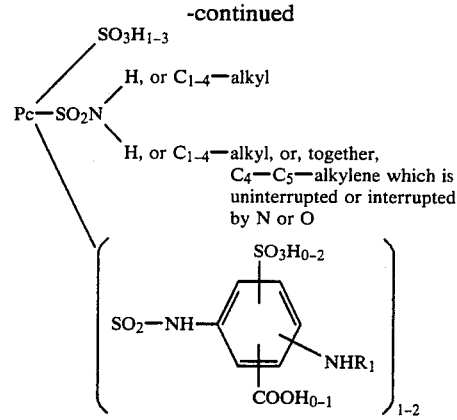

In this formula, Pc represents the Cu phthalocyanine radical or the Ni phthalocyanine radical. The total number of substituents on the Pc skeleton here is 4.

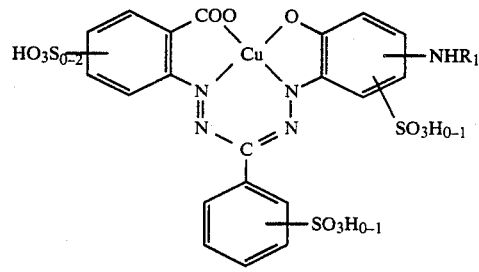

The alkyl or aryl radicals of the dyes of the abovementioned formulae can be further substituted, in particular by the substituents mentioned in the explanation of D in formula (1) or (3).

The following azo dyes of the formula (3) are particularly important:

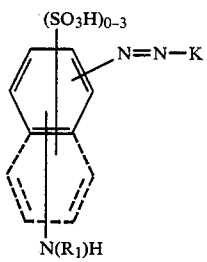

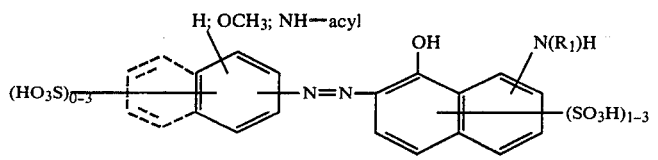

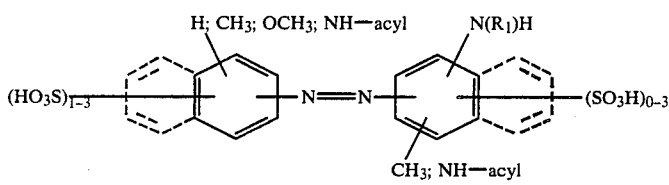

and

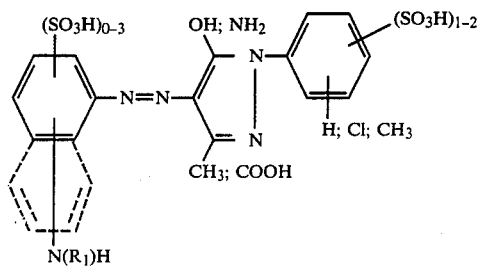

in which K is the radical of a coupling component of the benzene, naphthalene or heterocyclic series, acyl is a low-molecular aliphatic acyl radical having at most 3 carbon atoms or an aromatic radical having at most 8 carbon atoms, and $R_1$ is as defined in the explanation of formula (1), and the metal complex azo dyes of the formulae

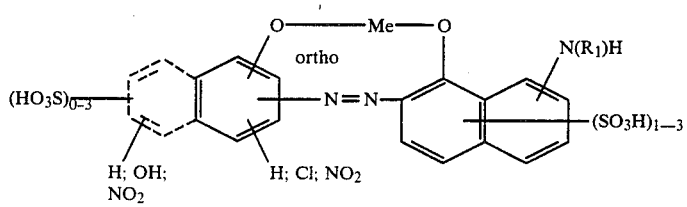

and

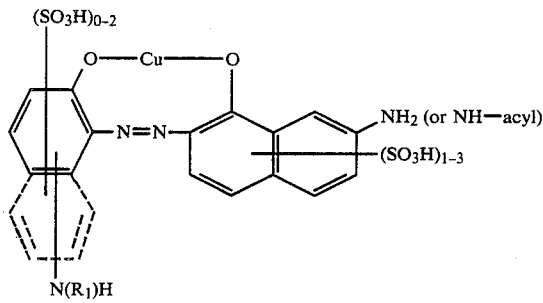

in which $R_1$ and acyl are as defined above and Me is Cu, Cr or Co.

In the preparation of the preferred reactive dyes of the formula (1) in which D is the radical of an azo dye, in particular of a monoazo or disazo dye, the diazotisation of the intermediates containing a diazotisable amino group is as a rule effected by the action of nitrous acid in aqueous-mineral acid solution at a low temperature, and the coupling is carried out at weakly acid, neutral or weakly alkaline pH values.

The condensation (sic) of cyanuric fluoride of the formula (2) with the dyes of the formula (3) and the amines of the formula (4) are preferably carried out in aqueous solution or suspension, at low temperature and at a neutral to alkaline pH value, in a manner such that one fluorine atom remains as a detachable radical in the finished dye of the formula (1). Hydrogen fluoride set free during the condensation is advantageously continuously neutralised by addition of aqueous alkali metal hydroxides, carbonates or bicarbonates.

If the reactive dyes of the formula (1) in which D is the radical of an azo dye contain complex-forming groups, for example hydroxyl or carboxyl groups, in the ortho-ortho'-position relative to the azo group, it is also possible to prepare metal complexes of the azo dyes of the formula (1), by treating the azo compounds which are obtained according to the invention and which contain complex-forming groups in the ortho-ortho'-position relative to the azo group with metal-donating agents before or, where relevant, after the condensation with cyanuric fluoride of the formula (2).

Copper complexes of azo dyes of the formula (1) are of particular interest. As well as the above-mentioned metallisation method, dealkylating metallisation and, for the preparation of copper complexes, oxidative coppering can also be used.

The dyes of the formula (1) are fibre-reactive, since they contain a detachable fluorine atom in the s-triazine radical.

Fibre-reactive compounds are to be understood as meaning those compounds which are capable of reacting with the hydroxyl groups of cellulose or with the amino groups of natural or synthetic polyamides to form covalent chemical bonds.

The reactive dyes of the formula (1) are distinguished by a high reactivity, and they produce dyeings with good wetfastness and lightfastness. They also have a good fixing ability and product dyeings with a remarkably good depth of shade.

The reactive dyes of the formula (1) are suitable for dyeing and printing a wide variety of materials, such as silk, leather, wool, high molecular weight polyamide fibres and high molecular weight polyamide-urethanes, and especially cellulose-containing materials with a fibrous structure, such as linen, wood pulp, regenerated cellulose and, in particular, cotton. They are suitable both for the exhaust process and for dyeing by the pad-dyeing process, in which the goods are impregnated with aqueous dye solutions, which may also contain salts, and the dyes are fixed after treatment with an alkali or in the presence of alkali, if necessary under the action of heat.

They are also suitable for printing, in particular on cotton, but also for printing on nitrogen-containing fibres, for example wool, silk or mixed fabrics containing wool.

It is advisable to rinse the dyeings and prints thoroughly with cold and hot water, if necessary with the addition of a dispersing agent which promote diffusion of the non-fixed portions.

In the examples which follow, the preparation of the monoazo or disazo intermediates is not described in every case, but the method follows readily from what has been stated above.

In the following examples, the parts are by weight and the temperatures are in degrees Centigrade.

EXAMPLE 1

75.2 parts of the dye of the formula

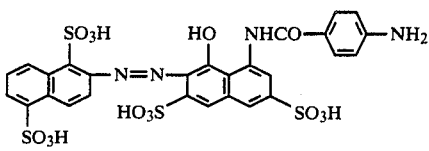

are dissolved in 700 parts of water at 20° C. under neutral conditions. After 5.6 parts of ammonium chloride have been added, the reaction solution is cooled to 0° to 5° C. and the pH value is adjusted to 8.5 with 2.5 parts by volume of 2N sodium hydroxide solution.

14.2 parts of cyanuric fluoride are added dropwise in the course of 35 minutes, with very good stirring. The temperature is allowed to rise to 20° C., and the pH value is kept at 8.5 by addition of 147 parts by volume of 2N sodium hydroxide solution. When the reaction has ended, the dye solution is adjusted to a pH value of 7.5 with 2.8 parts by volume of 1N hydrochloric acid. The reactive dye of the formula

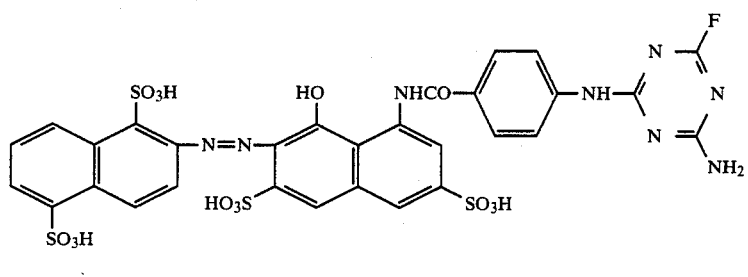

is now salted out by sprinkling in potassium chloride, and is filtered off, washed, and dried in vacuo. It is a red powder which dyes cotton and regenerated cellulose in bluish-tinged red shades.

Dyes with similar properties are obtained if the amino dyes listed in column 2 in Table 1 which follows are subjected to condensation with equivalent parts of cyanuric fluoride in the presence of ammonium salts in accordance with the statements of Example 1. Equivalent amounts of ammonium bromide, ammonium carbonate, ammonium fluoride, ammonium bicarbonate, ammonium bisulfate, ammonium nitrate, primary ammonium phosphate, secondary ammonium phosphate or ammonium sulfate, for example, can be used as the ammonium salts.

Example 1 is repeated using, instead of 5.6 parts of ammonium chloride, equivalent amounts of one of the ammonium salts in the following list: methylamine hydrochloride, dimethylamine hydrochloride, ethylamine hydrochloride, diethylamine hydrochloride, propylamine hydrochloride, isopropylamine hydrochloride, butylamine hydrochloride, isobutylamine hydrochloride and sec.-butylamine hydrochloride. The same results are achieved and the dyes substituted correspondingly to the amine used are obtained.

TABLE

| No. | Amino dye | Colour shade on cellulose |
|---|---|---|
| 2 | 1-Amino-3-acetylaminobenzene-6-sulfonic acid → 1-ethyl-3-sulfomethyl-4-methyl-6-hydroxy-pyrid-2-one-5-carboxylic acid | yellow |

TABLE-continued

| No. | Amino dye | Colour shade on cellulose |
|---|---|---|
| | amide (hydrolysed) | |
| 3 | 2-Amino-1-sulfo-5-aminomethyl-naphthalene → 1-ethyl-3-aminocarbonyl-4-methyl-6-hydroxy-pyrid-2-one (hydrolysed) | yellow |
| 4 | 2-Amino-5-aminomethyl-1,7-disulfo-naphthalene → 1-ethyl-3-aminocarbonyl-4-methyl-6-hydroxypyrid-2-one (hydrolysed) | yellow |
| 5 | 1-Amino-3-acetylaminobenzene-6-sulfonic acid → 1-(4'-sulfophenyl)-3-methyl-pyrazol-5-one (hydrolysed) | yellow |
| 6 | 1-Amino-3-acetylaminobenzene-6-sulfonic acid → 1-(4'-sulfophenyl)-3-carboxy-pyrazol-5-one (hydrolysed) | yellow |
| 7 | 1-Amino-3-acetylaminobenzene-6-sulfonic acid → 1-(2',5'-dichloro-4'-sulfophenyl)-3-methylpyrazol-5-one (hydrolysed) | yellow |
| 8 | 1-Amino-3-acetylaminobenzene-6-sulfonic acid → 1-(2',5'-disulfophenyl)-3-methyl-pyrazol-5-one (hydrolysed) | yellow |
| 9 | 1-Aminobenzene-2,5-disulfonic acid → 1-(3'-aminophenyl)-3-methylpyrazol-5-one (sic) | yellow |
| 10 | 1-Amino-3-acetylaminobenzene-6-sulfonic acid → 1-(4',8'-disulfonaphth-2'-yl)-3-methylpyrazol-5-one (hydrolysed) | yellow |
| 11 | 1-Amino-3-acetylaminobenzene-6-sulfonic acid → 1-(2'-methyl-4'-sulfophenyl)-3-carboxy-pyrazol-5-one (hydrolysed) | yellow |
| 12 | 1-Amino-3-acetylaminobenzene-6-sulfonic acid → 1-(3'-sulfophenyl)-3-methyl-pyrazol-5-one (hydrolysed) | yellow |
| 13 | 1-Amino-4-acetylaminobenzene-2-sulfonic acid → 1-carboxymethyl-pyrazol-5-one-3-carboxylic acid (hydrolysed) | yellow |
| 14 | 1-Amino-4-nitrobenzene-2-sulfonic acid → 4-amino-3,5-disulfoacetoacetanilide (reduced) | yellow |
| 15 | 1-Amino-4-acetylaminobenzene → 1-(2',5'-disulfophenyl)-3-methyl-pyrazol-5-one (hydrolysed) | reddish-tinged yellow |
| 16 | 1-Aminobenzene-2,4-disulfonic acid → 3-aminophenylurea | reddish-tinged yellow |
| 17 | 2-Aminonaphthalene-4,8-disulfonic acid → 1-amino-3-acetylaminobenzene | reddish-tinged yellow |
| 18 | 2-Aminonaphthalene-6,8-disulfonic acid → 1-amino-3-acetylaminobenzene | reddish-tinged yellow |
| 19 | 2-aminonaphthalene-3,6,8-trisulfonic acid → 3-aminophenylurea | reddish-tinged yellow |
| 20 | 2-Aminonaphthalene-4,6,8-trisulfonic acid → 1-amino-3-methylbenzene | reddish-tinged yellow |
| 21 | 2-Aminonaphthalene-3,6,8-trisulfonic acid → 1-amino-3-acetylaminobenzene | reddish-tinged yellow |
| 22 | 1-Aminobenzene-2,4-disulfonic acid → 1-aminonaphthalene-6-sulfonic acid → 1-amino-3-methylbenzene | brown |
| 23 | 2-Aminonaphthalene-4,8-trisulfonic acid → 1-aminonaphthalene-6-sulfonic acid → 1-amino-3-methylbenzene | brown |
| 24 | 1-Aminobenzene-2,5,7-trisulfonic acid → 1-aminonaphthalene-6-sulfonic acid → 1-aminonaphthalene-6-sulfonic acid | brown |
| 25 | 1-Amino-4-acetylaminobenzene-2-sulfonic acid → 1-hydroxy-7-(3'-sulfophenylamino)-naphthalene-3-sulfonic acid (hydrolysed) | brown |
| 26 | 1-Amino-3-acetylaminobenzene-6-sulfonic acid → 2-hydroxynaphthalene-6,8-disulfonic acid (hydrolysed) | orange |
| 27 | 1-Amino-3-acetylaminobenzene-6-sulfonic acid → 2-aminonaphthalene-5,7-disulfonic acid (hydrolysed) | orange |
| 28 | 1-Aminobenzene-2-sulfonic acid → 2-N—methyl-N—acetylamino-5-hydroxynaphthalene-7-sulfonic acid (hydrolysed) | orange |
| 29 | 1-Aminobenzene-2,5-disulfonic acid → 2-acetylamino-5-hydroxynaphthalene-7-sulfonic acid (hydrolysed) | orange |
| 30 | 2-Aminonaphthalene-1,7-disulfonic acid → 2-acetylamino-5-hydroxynaphthalene-7-sulfonic acid (hydrolysed) | orange |
| 31 | 2-Aminonaphthalene-1,5,7-trisulfonic acid → 2-acetylamino-5-hydroxynaphthalene-7-sulfonic acid (hydrolysed) | orange |
| 32 | 2-Aminonaphthalene-3,6,8-trisulfonic acid → 2-acetylamino-5-hydroxynaphthalene-7-sulfonic acid (hydrolysed) | orange |
| 33 | 2-Aminonaphthalene-1,7-disulfonic acid → 2-acetylamino-8-hydroxynaphthalene-6-sulfonic acid (hydrolysed) | scarlet |
| 34 | 2-Aminonaphthalene-1,5-disulfonic acid → 2-acetylamino-8-hydroxynaphthalene-6-sulfonic acid (hydrolysed) | scarlet |
| 35 | 2-Aminonaphthalene-1,5-disulfonic acid → 1-acetylamino-5-hydroxynaphthalene-7-sulfonic acid (hydrolysed) | orange |
| 36 | 1-Amino-4-methoxybenzene-2,5-disulfonic acid → 2-acetylamino-5-hydroxynaphthalene-7-sulfonic acid (hydrolysed) | scarlet |
| 37 | 1-Amino-4-methylbenzene-2,5-disulfonic acid → 2-acetylamino-5-hydroxynaphthalene-7-sulfonic acid (hydrolysed) | orange |
| 38 | 2-Aminonaphthalene-4,6,8-trisulfonic acid → 1-aminobenzene → 1-aminobenzene | orange |
| 39 | 1-Aminobenzene-2-sulfonic acid → 1-acetylamino-8-hydroxynaphthalene-3,6-disulfonic acid (hydrolysed) | red |
| 40 | 2-Aminonaphthalene-1,5-disulfonic acid → 1-acetylamino-8-hydroxynaphthalene-3,6-disulfonic acid (hydrolysed) | red |
| 41 | 1-Aminobenzene-2,4-disulfonic acid → 1-(4'-nitrobenzoylamino)-8-hydroxynaphthalene-3,6-disulfonic acid (reduced) | red |
| 42 | 1-Aminobenzene-2,5-disulfonic acid → 1-(3'-nitrobenzoylamino)-8-hydroxynaphthalene-3,6-disulfonic acid (reduced) | red |
| 43 | 1-Aminobenzene-2,4-disulfonic acid → 1-(4'-nitrobenzoylamino)-8-hydroxynaphthalene-4,6-disulfonic acid (reduced) | red |
| 44 | 2-Aminonaphthalene-1,5,7-trisulfonic acid → 1-(4'-nitrobenzoylamino)-8-hydroxynaphthalene-3,6-disulfonic acid (reduced) | red |
| 45 | 2-Aminonaphthalene-1,5-disulfonic acid → 1-(4'-nitrobenzoylamino)-8-hydroxynaphthalene-4,6-disulfonic acid (reduced) | red |
| 46 | 2-Aminonaphthalene-1,5,7-trisulfonic acid → 1-(3'-nitrobenzoylamino)-8-hydroxynaphthalene-4,6-disulfonic acid (reduced) | red |
| 47 | 2-Amino-1-sulfo-5-aminomethyl-naphthalene → 1-acetylamino-8-hydroxynaphthalene-3,6-disulfonic acid | red |
| 48 | 2-Amino-1-sulfo-5-aminomethyl-naphthalene → 1-benzoylamino-8-hydroxynaphthalene-3,6-disulfonic acid | red |
| 49 | 2-Amino-1-sulfo-5-aminomethyl-naphthalene → 1-acetylamino-8-hydroxynaphthalene-4,6-disulfonic acid | red |
| 50 | 2-Amino-1,7-disulfo-5-aminomethyl-naphthalene → 1-benzoylamino-8-hydroxynaphthalene-3,6-disulfonic acid | red |
| 51 | 2-Amino-1,7-disulfo-5-aminomethyl-naphthalene → 1-benzoylamino-8-hydroxynaphthalene-4,6-disulfonic acid | red |
| 52 | 1-Aminobenzene-2,4-disulfonic acid (acid coupling) → 1-amino-8-hydroxynaphthalene-3,6-disulfonic acid ← (alkaline coupling) 1-amino-3-acetylaminobenzene-6-sulfonic acid (hydrolysed) | blue |
| 53 | N—(2-Carboxy-5-sulfophenyl)-N'—(2'-hydroxy-3'-amino-5'-sulfophenyl)-ms-phenyl-formazan, Cu complex | blue |
| 54 | N—(2-Carboxy-5-sulfophenyl)-N'—(2'-hydroxy-3'-amino-5'-sulfophenyl)-ms-(4"-sulfo- | blue |

TABLE-continued

| No. | Amino dye | Colour shade on cellulose |
|---|---|---|
| | phenyl)-formazan, Cu complex | |
| 55 | N—(2-Carboxy-5-sulfophenyl)-N'—(2'-hydroxy-3',5'-disulfophenyl)-ms-(3''-aminophenyl)-formazan, Cu complex | blue |
| 56 | N—(2-Carboxy-4-sulfophenyl)-N'—(2'-hydroxy-5'-amino-3'-sulfophenyl)-ms-(4''-sulfophenyl)-formazan, Cu complex | blue |
| 57 | N—(2-Carboxy-4-aminophenyl)-N'—(2'-hydroxy-3',5'-disulfophenyl)-ms-(3''-sulfophenyl)-formazan, Cu complex | blue |
| 58 | N—(2-Carboxy-4-aminophenyl)-N'—(2'-hydroxy-3',5'-disulfophenyl)-ms-(2''-sulfophenyl)-formazan, Cu complex | blue |
| 59 | N—(2-Hydroxy-3-amino-5-sulfophenyl)-N'—(2'-hydroxy-4'-sulfophenyl)-ms-(2''-sulfophenyl)-formazan, Cu complex | blue |
| 60 | N—(2-Hydroxy-3-amino-5-sulfophenyl)-N'—(2'-hydroxy-3',5'-disulfophenyl)-ms-phenylformazan, Cu complex | blue |
| 61 | N—(2-Hydroxy-5-sulfophenyl)-N'—(2'-hydroxy-3',5'-disulfophenyl)-ms-(4''-aminophenyl)-formazan, Cu complex | blue |
| 62 | N—(2-Hydroxy-3-amino-5-sulfophenyl)-N'—(2'-hydroxy-3',5'-disulfophenyl)-ms-(4''-sulfophenyl)-formazan, Cu complex | blue |
| 63 | N—(2-Hydroxy-5-amino-3-sulfophenyl)-N'—(2',5'-disulfophenyl)-ms-phenyl-formazan, Cu complex | blue |
| 64 | N—(2-Hydroxy-4,6-disulfophenyl)-N'—(2',4'-disulfophenyl)-ms-(3''-aminophenyl)-formazan, Cu complex | blue |
| 65 | 1-Diazo-2-hydroxy-6-nitronaphthalene-4-sulfonic acid → 1-amino-8-hydroxynaphthalene-2,4-disulfonic acid (reduced), Cu complex | blue |
| 66 | 1-Diazo-2-hydroxy-6-nitronaphthalene-4-sulfonic acid → 1-hydroxynaphthalene-4,8-disulfonic acid (reduced), Cu complex | violet |
| 67 | 2-Aminonaphthalene-4,6,8-trisulfonic acid → 2-hydroxy-6-acetylaminonaphthalene-4-sulfonic acid, coppered with oxidation (hydrolysed) | reddish-tinged blue |
| 68 | 1-Diazo-2-hydroxy-6-nitronaphthalene-4-sulfonic acid → 1-benzoylamino-8-hydroxy-naphthalene-3,6-disulfonic acid (reduced), Cu complex | bluish-tinged violet |
| 69 | 2-Amino-4,6,8-trisulfonic acid → 2-acetylamino-5-hydroxynaphthalene-7-sulfonic acid, coppered with oxidation (hydrolysed) | violet |
| 70 | 2-Aminonaphthalene-4,8-disulfonic acid → 2-acetylamino-5-hydroxynaphthalene-4,8-disulfonic acid, coppered with oxidation (hydrolysed) | bluish-tinged violet |
| 71 | 2-Aminonaphthalene-6,8-disulfonic acid → 2-acetylamino-5-hydroxynaphthalene-7-sulfonic acid, coppered with oxidation (hydrolysed) | claret |
| 72 | 2-Aminonaphthalene-4,8-disulfonic acid → 1-amino-8-hydroxynaphthalene-3,6-disulfonic acid, coppered with oxidation | blue |
| 73 | 1-Amino-4-acetylaminobenzene-2-sulfonic acid → 1-amino-2-methoxy-5-methylbenzene → 1-hydroxynaphthalene-3,6,8-trisulfonic acid, coppered with demethylation (hydrolysed) | navy blue |
| 74 | 1-Hydroxy-2-aminobenzene-4,6-disulfonic acid → 2-amino-5-hydroxynaphthalene-7-sulfonic acid, Cu complex | ruby |
| 75 | 1-Hydroxy-2-aminobenzene-4,6-disulfonic acid → 2-amino-8-hydroxynaphthalene-6-sulfonic acid, Cu complex | ruby |
| 76 | 1-Hydroxy-2-aminobenzene-4,6-disulfonic acid → 2-(4'-aminophenylamino)-5-hydroxynaphthalene-7-sulfonic acid, Cu complex | violet |
| 77 | 1-Hydroxy-2-aminobenzene-5-sulfonic acid → 1-amino-8-hydroxynaphthalene-3,6-disulfonic acid, Cu complex | violet |
| 78 | 1-Hydroxy-2-amino-4-chlorobenzene-5-sulfonic acid → 2-methylamino-8-hydroxynaphthalene-6-sulfonic acid, Cu complex | violet |
| 79 | 1-Hydroxy-2-amino-4-acetylaminobenzene-6-sulfonic acid → 1-amino-8-hydroxynaphthalene-2,4-disulfonic acid, Cu complex (hydrolysed) | blue |
| 80 | 1-Amino-4-(3'-amino-4'-sulfophenylamino)-anthraquinone-2-sulfonic acid | blue |
| 81 | 1-Amino-4-(4'-amino-3'-sulfophenylamino)-anthraquinone-2-sulfonic acid | blue |
| 82 | 1-Amino-4-(3'-amino-4'-sulfophenylamino)-anthraquinone-2,7-disulfonic acid (sic) | blue |
| 83 | 1-Amino-4-(4'-amino-3'-sulfophenylamino)-anthraquinone-2,7-disulfonic acid | blue |
| 84 | 1-Amino-4-(4'-amino-2'-sulfophenylamino)-anthraquinone-2,6-disulfonic acid | blue |
| 85 | 1-Amino-4-(4'-amino-3'-sulfophenylamino)-anthraquinone-2,6-disulfonic acid | blue |
| 86 | 1-Amino-4-(3'-amino-2'-methyl-5'-sulfophenylamino)-anthraquinone-2-sulfonic acid | blue |
| 87 | 1-Amino-4-(4'-amino-cyclohexylamino)-anthraquinone-2,6-disulfonic acid | blue |
| 88 | 1-Amino-4-(3'-amino-2'-methyl-5'-sulfophenylamino)-anthraquinone-2,6-disulfonic acid | blue |
| 89 | 1-Amino-4-(4'-methylamino-2'-sulfophenylamino)-anthraquinone-2,7-disulfonic acid | blue |
| 90 | 1-Amino-4-(3'-aminomethyl-2',6'-dimethyl-5'-sulfophenylamino)-anthraquinone-2,6-disulfonic acid | blue |
| 91 | 1-Amino-4-(3'-amino-2'-methyl-5'-sulfophenylamino)-anthraquinone-2,5-disulfonic acid | blue |
| 92 | 1-Amino-4-(2'-aminomethyl-4'-methyl-6'-sulfophenylamino)-anthraquinone-2-sulfonic acid | blue |
| 93 | CuPc (3) —(SO$_3$H)$_2$ —(SO$_2$NH$_2$)$_1$ —(SO$_2$NH—⟨phenyl⟩—NH$_2$)$_1$ | turquoise blue |
| 94 | CuPc (3) —(SO$_3$H)$_2$ —(SO$_2$NH$_2$)$_1$ —(SO$_2$NH—⟨phenyl-NH$_2$⟩)$_1$ | turquoise blue |
| 95 | CuPc (3) —(SO$_3$H)$_3$ —(SO$_2$NH—⟨phenyl-NH$_2$⟩)$_1$ | turquoise blue |
| 96 | CuPc (4) —(SO$_3$H)$_2$ —(SO$_2$NH$_2$)$_1$ —(SO$_2$NH—⟨phenyl-NH$_2$⟩)$_1$ | turquoise blue |
| 97 | NiPc (3) —(SO$_3$H)$_3$ —(SO$_2$NH—⟨phenyl-NH$_2$⟩)$_1$ | greenish-tinged blue |
| 98 | NiPc (3) —(SO$_3$H)$_3$ —(SO$_2$NH—⟨phenyl⟩—NH$_2$)$_1$ | greenish-tinged blue |

TABLE-continued

| No. | Amino dye | Colour shade on cellulose |
|---|---|---|
| 99 | CuPc (3) —(SO$_2$NH$_2$)$_1$ —(SO$_3$H)$_2$ (SO$_2$NH—⟨C$_6$H$_3$(CH$_3$)(NH$_2$)⟩—SO$_3$H)$_1$ | turquoise blue |
| 100 | CuPc (3) —(SO$_3$H)$_3$ —(SO$_2$NHCH$_2$CH$_2$NH$_2$)$_1$ | turquoise blue |
| 101 | CuPc (3) —(SO$_3$H)$_2$ —(SO$_2$NH$_2$)$_1$ —(SO$_2$NH—⟨C$_6$H$_4$⟩—NHCH$_3$)$_1$ | turquoise blue |
| 102 | CuPc (3) —(SO$_3$H)$_2$ —(SO$_2$NH$_2$)$_1$ —(SO$_2$N(CH$_3$)CH$_2$CH$_2$NHCH$_3$)$_1$ | turquoise blue |
| 103 | CuPc (3) —(SO$_3$H)$_2$ —(SO$_2$NH$_2$)$_1$ —(SO$_2$NH(CH$_2$)$_4$NH$_2$)$_1$ | turquoise blue |
| 104 | CuPc (3) —(SO$_3$H)$_2$ —(SO$_2$NH$_2$)$_1$ —(SO$_2$NHCH$_2$CH$_2$NH$_2$)$_1$ | turquoise blue |
| 105 | CuPc (3) —(SO$_3$H)$_3$ —(SO$_2$NH—⟨C$_6$H$_3$(COOH)(NH$_2$)⟩)$_1$ | turquoise blue |
| 106 | CuPc (3) —(SO$_3$H)$_2$ —(SO$_2$NH$_2$)$_1$ —(SO$_2$NH(CH$_2$)$_3$NHCH$_3$)$_1$ | turquoise blue |

DYEING INSTRUCTIONS I 2 parts of the dye obtained according to Example 1 are dissolved in 100 parts of water, with the addition of 0.5 part of sodium m-nitrobenzenesulfonate. A cotton fabric is impregnated with the resulting solution so that its weight is increased by 75%, and the fabric is then dried.

Thereafter, the fabric is impregnated with a solution, at 20°, which contains, per liter, 5 grams of sodium hydroxide and 300 grams of sodium chloride, and is squeezed off to a weight increase of 75%, and the dyeing is steamed at 100° to 101° for 30 seconds, rinsed, soaped in a 0.3% boiling solution of an ion-free detergent for quarter of an hour, rinsed and dried.

DYEING INSTRUCTIONS II 2 parts of the dye which can be obtained according to Example 1 are dissolved in 100 parts of water.

The solution is poured into 1,900 parts of cold water, 60 parts of sodium chloride are added, and 100 parts of a cotton fabric are introduced into this dyebath.

The temperature is increased to 40°, 40 parts of calcined sodium carbonate and a further 60 parts of sodium chloride being added after 30 minutes. The temperature is kept at 40° for 30 minutes, and the dyeing is rinsed, and then soaped in a 0.3% boiling solution of an ion-free detergent for 15 minutes, rinsed and dried.

What is claimed is:

1. A process for the preparation of a dye of the formula $$D-N(R_1)-C(=N-)-N=C(-NH R_2)-... F \quad (1)$$

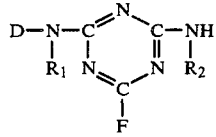

in which D is a dye radical and $R_1$ and $R_2$ independently of one another is (sic) hydrogen or $C_{1-4}$-alkyl, which comprises reacting cyanuric fluoride of the formula

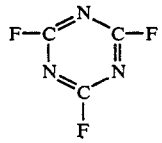

(2)

simultaneously with a dye of the formula $$D-NH \atop R_1 \quad (3)$$

and with an ammonium salt of an amine of the formula $$H_2N-R_2 \quad (4)$$

in a neutral to alkaline medium, said process being one in which the cyanuric fluoride is introduced into an aqueous solution containing the amino dye and the ammonium salt of the amine.

2. A process according to claim 1, wherein the pH value of the aqueous solution is adjusted to 7 to 10.

3. A process according to claim 2, wherein the pH value of the aqueous solution is adjusted to 8 to 9.

4. A process according to any one of claims 1 to 3, wherein ammonia is used as the amine of the formula (4), and is employed as ammonium chloride.

5. A process according to any one of claims 1 to 4, wherein an aminoazo dye is used as the dye of the formula (3).

6. A process according to claim 5, wherein an aminoazo dye of the formula

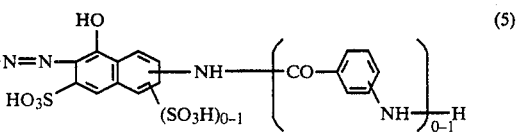

in which $D_1$ is the radical of a diazo component of the benzene or naphthalene series, is used.

7. A process according to claim 6, wherein an aminoazo dye of the formula

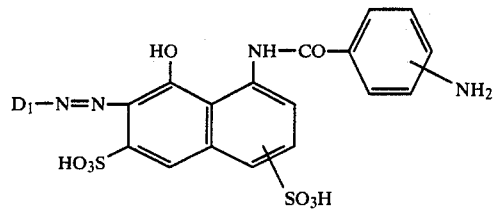 (6)
in which D₁ is as defined in claim 6, is used.
8. A process according to claim 7, wherein the dyestuff of the formula
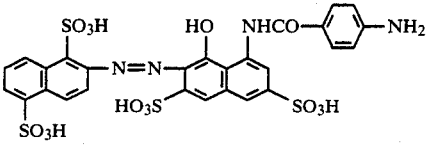 (7)
is used.
* * * * *